Patented Nov. 18, 1947

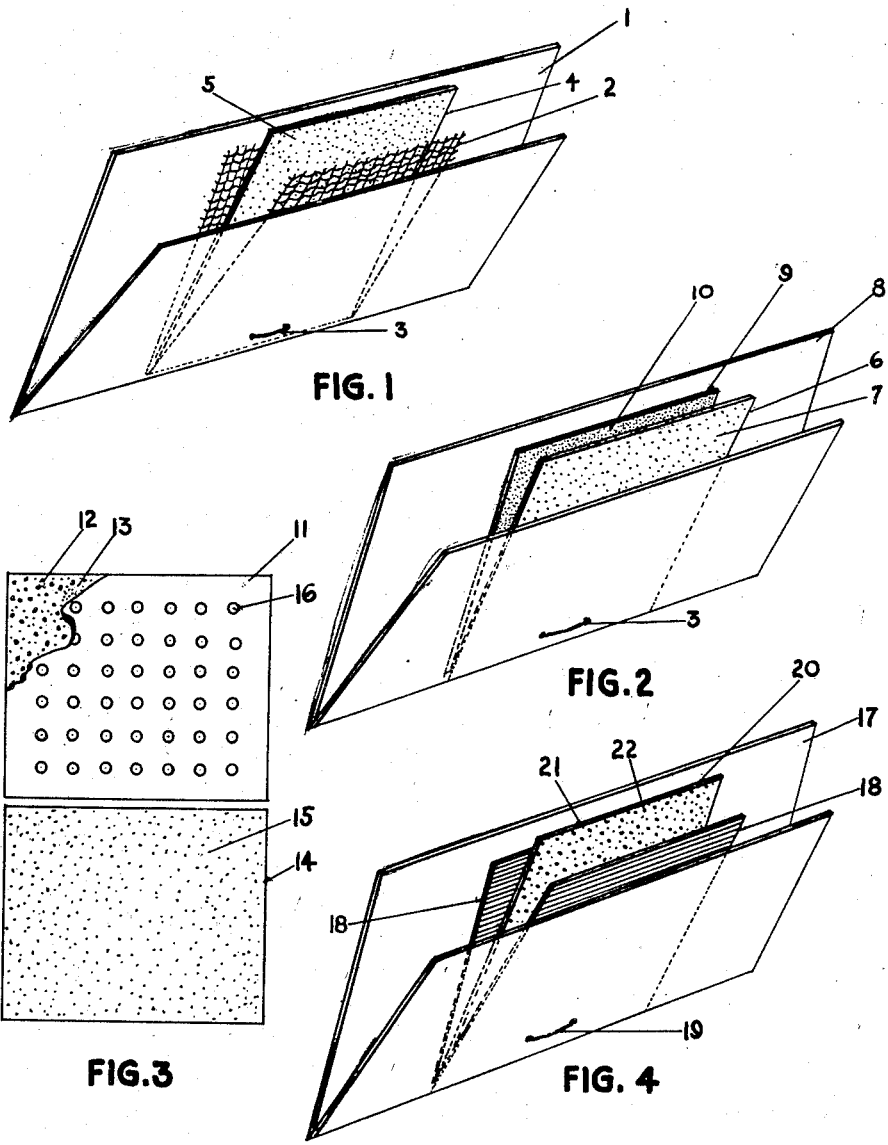

2,431,220

UNITED STATES PATENT OFFICE 2,431,220

EXOTHERMIC HEATING SYSTEM FOR HAIR WAVING

Ralph L. Evans, New York, and Everett G. McDonough, Yonkers, N. Y.

Application May 1, 1937, Serial No. 140,208

28 Claims. (Cl. 132—56.2)

Our invention relates generally to the art of chemical heaters and in its more specific aspect to the art of producing a so-called "permanent wave" in living human hair by subjecting the hair to heat produced by an exothermic reaction.

Our invention presents many advantages in composition of the chemicals or chemical mixtures and in the construction of the devices used to carry the reacting chemicals and hold them in the necessary close proximity to the hair while they are reacting.

Heretofore, the reacting chemicals have been mixed and placed within an envelope and the reaction was initiated in this envelope by the introduction of water or a solution, usually carried to the envelope by an absorbent material or layer. It was necessary to have within the envelope, material or materials with water-adsorptive properties so that the reaction could be initiated and extended over a longer period.

We have found that a simplified reacting unit can be made by isolating the principal reacting components and bringing them together through a solution medium when the initiation of the reaction is desired. Our simplified construction has the added advantage that the accidental wetting of the isolated reacting components will not destroy their effectiveness as is the case when the envelope containing all the reacting components, is accidentally wet.

By way of exemplification but without limiting our invention or claim thereto the following examples are given.

In an exothermic reaction where the heat is generated by the reaction of two components A and B respectively we have found it advantageous to separate these components. For example, in the consideration of an exothermic chemical reaction of the oxidation-reduction type, we have isolated the reducing substance B from the oxidizing substance A. By way of illustration, our invention may take the form of an absorbent, such as blotting paper, felt, flannel, asbestos or the like, in which we have evenly distributed the reducing agent. This even distribution can be readily accomplished by dipping the absorbents into saturated solutions of A and B. If the components are not soluble as is for example when the reducing substance is a metal, such as aluminum, then the absorbent may be impregnated by metallic dispersion, preferably colloidal, in the wetting liquid. Water soluble adhesive also can be used to adhere fine particles of insoluble reducing or oxidizing substances to the carrying unit. In some cases the reducing agent may consist of the proper metal in the form of a foil sheet, wire screening or gauze, or laminated sheets of the metal forms, perforated or unperforated, with or without absorbent sheets being interposed. As an example, we may use three sheets of properly treated absorbent separated by two perforated sheets of metal foil.

In some cases the reacting components will not react without the introduction of other substances. For example, when potassium chlorate is the oxidizing substance and aluminum foil is the reducing substance it is necessary to add a catalyst such as a replaceable metal or its compounds and preferably also a hydrogen ion controlling substance. For the purpose of clarification we will call these reaction controlling substances C. Replaceable metals are such as mercury, copper, lead and typical compounds of these are their oxides, acetates, chlorides, sulphates, etc. Substances furnishing hydrogen ions are acidic substances, such as acid salts (sodium bisulfate, aluminum sulphate), organic acids (tartaric, citric, maleic) or inorganic acids (boric, molybdic).

It can readily be appreciated that with a system having three reacting components various modifications can be made and that these modifications can be multiplied as the number of reacting components are increased and that thus in our description of the various modifications we do not wish to be limited to them since they are given only as examples and for the purpose of exemplification. Some of the modifications are 1. Containers or sheets of reactant A, B, and C may be prepared and these containers kept separate until initiation of the reaction is desired or these containers may be laminated into one unit by adhering, stapling or stitching.

2. Two containers or sheets, one containing A and the other B and C, or one containing C and the other A and B, or one containing B and the other A and C may be kept separate until initiation of the reaction, etc., as above.

3. One container or sheet containing A, or B, or C, or A and B, or A and C, or C and B and another untreated carrier sheet capable of being wet with solutions of B and C, A and C, A and B, C, B, or A, respectively, when initiation of the reaction is desired.

Other novel features and advantages of our invention hereinafter appear.

Without limiting our invention or claims thereto, the accompanying drawings, show for purposes of exemplification, certain special embodiments of the invention:

Fig. 1 is a perspective view of one form of our invention.

Fig. 2 is a perspective view of a modified form thereof.

Fig. 3 shows a plan view of a third form of our invention.

Fig. 4 shows a perspective view of still another form.

We have found that some metals are oxidized by air with the liberation of heat sufficient to give a permanent wave if the proper controlling substances are used. In those cases where the oxygen in the air can furnish the oxidizing substance A it will only be necessary to supply the controlling substance C and the reducing substance B. These may be used according to the various modifications as treated above, but as an excellent example of this type of reaction, we have found that we can impregnate a strip of absorbent with bichloride of mercury, the controlling substance, and use aluminum screening or foil as the reducing substance. Placing the water-wet bichloride of mercury absorbent in contact with the aluminum would cause a system to be formed whereby the aluminum would react with the oxygen of the air to liberate heat. Fig. 1 shows an example of this set-up. 1 is a backing sheeting, to which is attached the aluminum wire screen 2, with the staple 3. In use the absorbent 4, which is impregnated with bichloride of mercury 5, is wet with water and inserted between the fold of the metal screen.

As an example of our invention where two substances react to produce heat, we have found that when an absorbent containing a sulfite and an absorbent containing a persulfate are brought in contact and wet with water heat is generated. Another variation of this would be to leave one of the absorbent untreated and wet with hydrogen peroxide when ready to use. Fig. 2 represents an example of this. The absorbent 6, impregnated with a sulfite 7, is attached to the backing sheet 8, with the staple 3. In use the absorbent 9, impregnated with a persulfate 10, is wet and placed onto the absorbent 6.

As an example of using a reaction involving three substances, we have found that we can use an oxidizing agent, such as potassium chlorate, a reducing agent such as aluminum, and a controlling substance such as copper sulfate.

As an example of our invention for handling this three component system, we place two of the reactants in a perforated foil envelope and have the other contained in a water absorbent material. Fig. 3 represents this set-up. The envelope 11 has been drawn with a corner section of the top face cut away in order to show that it contains aluminum metal 12 and the copper sulfate 13. In use the absorbent 14, containing the potassium chlorate 15, is dipped into water and pressed onto the perforation 16 of the envelope.

We have also found by a modification of the above invention that the need for wetting an absorbent and placing it onto the perforated envelope can be avoided by inserting a section of an absorbent material within the envelope, or by making the absorbent material a part of the envelope, as for example by having one face of the envelope composed of an absorbent material. Also a solution of copper sulphate and potassium chlorate can be adsorbed in an absorbent and the water driven out. On use, this adsorbent is wet and placed in contact with the reducing substance, a metal foil, such as aluminum or zinc. Fig. 4 illustrates this set-up. To the backing sheet 17 is attached the aluminum foil sheet 18, with the staple 19. In use the absorbent 20, impregnated with copper sulfate 21 and potassium chlorate 22, are wet with water and placed within the folds of the aluminum foil sheets.

The term "pad" as used in the appended claims is intended to apply to the aggregate components of the heating unit of our invention regardless of whether said components or some of them are kept separate until initiation of the reaction or are physically connected theretofore.

It will be understood that many changes may be made in the forms and features disclosed without departing from the spirit of our invention and that certain features may some times be used to advantage without a corresponding use of other features.

We claim:

1. A heating pad for the permanent waving of hair including normally unmixed ingredients, absorbent material impregnated with certain of said ingredients and in proximity to certain other of said ingredients, said absorbent containing a solvent for certain of said ingredients which causes the solution to contact the remainder of said ingredients to effect the generation of heat.

2. A heating pad for the permanent waving of hair including normally unmixed ingredients, a sheet of absorbent material impregnated with certain of said ingredients and in proximity to certain other of said ingredients disposed in a substantially coextensive sheet, said absorbent when treated with a solvent for certain of said ingredients causing the solution to contact the remainder of said ingredients to effect the generation of heat.

3. A heating pad for the permanent waving of hair including normally unmixed ingredients, a sheet of absorbent material impregnated with certain of said ingredients, a sheet of absorbent material impregnated with other of said ingredients, said absorbent sheets when treated with a solvent for certain of said ingredients causing the solution to contact the remainder of said ingredients to effect the generation of heat.

4. A heating pad for the permanent waving of hair having ingredients, certain of which are unmixed but which when in sufficiently intimate contact with each other react to generate heat, and means normally preventing contact sufficiently intimate to cause such reaction but causing certain of said ingredients when treated with a solvent to pass into sufficiently intimate contact with the remainder of said ingredients to generate heat.

5. A heating pad for the permanent waving of hair having ingredients, certain of which are unmixed but which when in sufficiently intimate contact with each other react to generate heat, certain of said ingredients when treated with a solvent passing into sufficiently intimate contact with the remainder of said ingredients to generate heat.

6. The combination as defined in claim 5 in which an envelope pervious to the solution contains one of said ingredients in dry form and another of said ingredients is impregnated in an absorbent carrying said solvent, the generation of heat being initiated by placing said wet, impregnated absorbent adjacent the pervious portion of said envelope.

7. The combination as defined in claim 6 in which one of said ingredients is an oxidizing agent and another is a reducing agent.

8. The combination as defined in claim 7 wherein the ingredient in said envelope is in powdered form and is incapable of reacting with water alone to generate heat.

9. The combination as defined in claim 2 in which the sheet or sheets of said other of said ingredients extend on opposite sides of said first mentioned sheet.

10. The combination as defined in claim 1 in which an envelope pervious to the solution contains said certain other of said ingredients.

11. The method of generating heat for the permanent waving of hair which include normally maintaining in unmixed condition ingredients capable, when in sufficiently intimate contact, of reacting on each other to generate heat, treating one of said ingredients with a solvent and passing the solution into contact with the remainder of said ingredients to cause the generation of heat and applying said heat to the hair.

12. In a chemical heating pad for permanent hair waving, a sheet of aluminum foil, and a flexible sheet of absorbent material in contact with one side of the aluminum foil, the sheet of aluminum foil being perforated and the sheet of absorbent material being capable of retaining a chemical solution for exothermic reaction with the metallic foil.

13. In a chemical heating pad for permanent hair waving, a sheet of metallic foil, and a sheet of asbestos paper disposed in intimate contact with one side of the aluminum foil, the sheet of asbestos fiber being adapted to be saturated with a chemical solution for exothermic reaction with the aluminum foil.

14. In means for applying heat to wound hair for permanent hair waving operations, making use of a pad including a sheet of aluminum and absorbent material in physical contact with the same, a chemical solution adapted to be applied to saturate the absorbent material and carrying all of the chemical necessary for exothermic reaction with the aluminum foil to generate heat.

15. In means for carrying out heating operations for permanent hair waving, characterized by the use of a pad consisting of a sheet of aluminum in physical contact with a sheet of absorbent material, a solution carrying all of the chemical necessary for exothermic reaction with the aluminum to generate heat, the chemical carried by the solution including a copper salt from which copper is displaced by reaction with the aluminum.

16. In means for use in carrying out heating operations for permanent hair waving, characterized by the use of a pad having a sheet of aluminum in physical contact with absorbent material, a chemical solution for saturating said absorbent material to effect an exothermic reaction with the aluminum, said solution including a copper salt and an oxidizing agent.

17. In a permanent hair waving method, wherein strands of hair are wound upon curlers preparatory to a heating operation, the improvement comprising placing in heat transfer relationship with the wound hair a sheet of aluminum, and causing at least one side face of the sheet of aluminum to be contacted with a piece of absorbent material, said absorbent material being saturated immediately prior to the waving operation with a chemical solution carrying all of the chemical necessary for exothermic reaction with the aluminum.

18. A hair waving unit including a sheet of metal, a layer of material on one surface of the metal, said layer being of a composition which, while in a moist condition, will attack the metal to react exothermically, and a protective coating applied to that surface of the metal remote from said layer.

19. A hair waving unit including a sheet of metal foil, a layer of material on one surface of the metal and formed of a composition which, while in a moist condition, will attack the metal foil to react exothermically, and a sheet of protective material applied to that surface of the foil remote from said layer for contact with the hair being treated.

20. A hair waving unit including a normally stiff and dry absorbent sheet, and metal in contact with the sheet, said sheet being impregnated with a chemical which, when moistened, will attack the metal to react exothermically, and a protective coating in contact with the metal.

21. In an exothermic heating pad, a chemically impregnated member adapted to be moistened to liberate a solution of said chemical, and a pervious metallic member adapted to react with said solution to evolve heat.

22. In an exothermic heating pad, a chemically impregnated member adapted to be moistened to liberate a solution of said chemical, and a metallic member adapted to react with said solution to liberate heat, said metallic member being adapted to pass products of said reaction therethrough.

23. In an exothermic heating pad, an absorbent member impregnated with a chemical and adapted to liberate a solution of said chemical when moistened, a metallic member adapted to react with said solution to evolve heat, and a member disposed between said absorbent and metallic members.

24. In an exothermic heating pad, an absorbent member impregnated with a chemical and adapted to liberate a solution of said chemical when moistened, a metallic member adapted to react with said solution to evolve heat, and a pervious member disposed between said absorbent and metallic members.

25. In an exothermic heating pad, an absorbent member impregnated with a chemical and adapted to liberate a solution of said chemical when moistened, a metallic member adapted to react with said solution to evolve heat, and a member disposed between said absorbent and metallic members adapted to conduct said solution to said metallic member at a predetermined rate.

26. In an exothermic heating pad utilizing flow of a solution from one part of said pad to another part of said pad to react at said second part to evolve heat, means for effectively insulating said first part of said pad from said second part, said means comprising a sheet member impervious to passage of minute quantities of moisture, but allowing passage of relatively large quantities of said solution.

27. In an exothermic heating pad, a reactive metallic member, means for receiving the products of reaction disposed on one side of said member, and means for applying a solution to the opposite side of said member to react therewith to evolve heat.

28. A hair waving unit including an absorbent sheet impregnated with a chemical which when moistened will attack metal to react exothermically, and a metal sheet in contact therewith.

RALPH L. EVANS.
EVERETT G. McDONOUGH.

REFERENCES CITED

The following references are of record in the file of this patent:

UNITED STATES PATENTS

| Number | Name | Date |
|---|---|---|
| 1,894,797 | Seward | Jan. 17, 1933 |
| 1,894,798 | Seward | Jan. 17, 1933 |
| 2,018,367 | Lackenbach | Oct. 22, 1935 |

FOREIGN PATENTS

| Number | Country | Date |
|---|---|---|
| 457,230 | Great Britain | Nov. 24, 1936 |
| 788,003 | France | July 22, 1935 |